United States Patent
Sexton et al.

(10) Patent No.: US 6,434,685 B1
(45) Date of Patent: Aug. 13, 2002

(54) PAGED MEMORY MANAGEMENT SYSTEM WITHIN A RUN-TIME ENVIRONMENT

(75) Inventors: Harlan Sexton; David Unietis, both of Menlo Park; Mark Jungerman, San Francisco; Scott Meyer, Pacifica, all of CA (US)

(73) Assignee: Oracle Corp., Redwood Shores, CA (US)

( * ) Notice: Subject to any disclaimer, the term of this patent is extended or adjusted under 35 U.S.C. 154(b) by 0 days.

(21) Appl. No.: 09/248,297

(22) Filed: Feb. 11, 1999

(51) Int. Cl.[7] .............................................. G06F 12/10
(52) U.S. Cl. ...................................... 711/206; 711/209
(58) Field of Search ................................ 711/202, 203, 711/206, 209

(56) References Cited

U.S. PATENT DOCUMENTS

| | | |
|---|---|---|
| 5,426,747 A | 6/1995 | Weinreb et al. |
| 5,794,256 A | 8/1998 | Bennett et al. |
| 5,805,896 A | 9/1998 | Burgess |
| 5,845,331 A | 12/1998 | Carter et al. |
| 6,009,266 A | 12/1999 | Brownell et al. |
| 6,105,041 A | 8/2000 | Bennett et al. |
| 6,128,621 A | 10/2000 | Weisz |
| 6,154,823 A * | 11/2000 | Benayon et al. ............ 711/171 |
| 6,178,519 B1 | 1/2001 | Tucker |
| 6,199,141 B1 | 3/2001 | Weinreb et al. |
| 6,298,401 B1 | 10/2001 | Anderson |

FOREIGN PATENT DOCUMENTS

| | | |
|---|---|---|
| EP | 0 700 000 A2 | 3/1996 |
| EP | 0 874 309 A2 | 10/1998 |
| EP | 0967546 A2 | 12/1999 |
| GB | 2 239 335 A | 9/1990 |

OTHER PUBLICATIONS

Bruce Millard et al., "Run–Time Support and Storage Management for Memory–Mapped Persistent Objects" Dec. 1993, IEEE.

"Pointer Swizzling at Page Fault Time: Efficiently Supporting Huge Address Spaces on Standard Hardware"–Jun. 1991 No. 4–pp. 6–13 vol. 19 Computer Architecture News.

"Working with Persistant Objects: to Swizzle or Not to Swizzle"–pp. 657–673, Moss, J. Eliot B. IEEE.

"Garbage Collection", pp. 143–163, Jones, Richard et al., 1996.

Pages 1–38, Ginderman, David, "Representing Type Information in Dynamically Typed Languages" 1993.

"A Real–Time Garbage Collector Based on the Lifetimes of Objects"–vol. 26 No. 6 Communications of the ACM, Jun. 1983, pp. 419–429.

Oracle8i Java Developer's Guide –pp. 1–17, Harris, Steven G. 1999.

* cited by examiner

*Primary Examiner*—Kevin Verbrugge
(74) *Attorney, Agent, or Firm*—Ditthavong & Carlson, P.C.

(57) ABSTRACT

In a paged memory system, memory is allocated as pages and aligned on $2^N$-byte boundaries that are at least as large as the largest page size. Memory management information about the page is stored in a page header at the beginning of the page, while the remaining space of the page is devoted for storing objects. The page header for the page on which at least some of the object is stored is located by masking off the lower N-bits of the machine pointer. These operation can be applied to converting machine pointers into and out of page-offset numeric references.

28 Claims, 3 Drawing Sheets

PAGED MEMORY MANAGEMENT SYSTEM WITHIN A RUN-TIME ENVIRONMENT

RELATED APPLICATIONS

The present application is related to the following applications:

U.S. patent application Ser. No. 09/248,295, entitled "A Memory Management System Within a Run-Time Environment," filed on even date herewith by Harlan Sexton et al. the contents of which are hereby incorporated by reference.

U.S. patent application Ser. No. 09/248,291, entitled "A Machine Independent Memory Management System Within a Run-Time Environment," filed on even date herewith by Harlan Sexton et al., the contents of which are hereby incorporated by reference.

U.S. patent application Ser. No. 09/248,294, entitled "Address Calculation of Invariant References Within a Run-Time Environment," filed on even date herewith by Harlan Sexton et al., the contents of which are hereby incorporated by reference.

FIELD OF THE INVENTION

The present invention relates to computer systems and more particularly to managing memory for a run-time environment.

BACKGROUND OF THE INVENTION

A dynamic run-time environment for a language such as JAVA™ is responsible for managing memory for objects that are created and destroyed during the execution of a program. An object may be defined as a logically contiguous atomic unit of typed state of the program. Objects thus encapsulate data in particular regions of memory that are allocated and deallocated for the program by the dynamic run-time environment.

The state of the program, or "program state," is the set of the objects and the references between the objects that exist at a specific point in time during the execution of the program. A "reference" is an entity used to identify and ultimately access the region of memory for storing the data of the object. Typically, references between objects in a run-time environment are encoded using machine pointers, which contain the memory address of the referenced objects. Since machine pointers are closely coupled to the underlying hardware and firmware of a computer system, machine pointers provide a fast means of accessing objects and, hence, are a popular implementation for references.

A program state containing machine pointers is so machine-dependent that it is sometimes disadvantageous. For example, it may be desirable to store the program state on disk and restore the stored program state to main memory, even between different types of machines. For instance, some run-time environments provide load-balancing and crash recovery functions by transferring the execution of a program from one machine to another.

Differences between server environments make machine independence very difficult to achieve for portable run-time environments. For example, some operating systems, in practice if not by design, limit the guaranteed size of contiguous virtual memory to a "page," typically about two or four kilobytes in size, and prior paged memory systems simply failed when sufficient large blocks of virtual memory was not available. This page-size limitation is particularly common for allocating objects in shared memory for access by different processes.

If the run-time environment is modified to allow objects to be allocated in a plurality of non-contiguous pages, however, then the overhead in calculating which parts of an object belong to which pages becomes a significant factor in system performance. For example, one way to determine which pages belong to an object is to maintain an ancillary data structure called a page map that lists a set of pages in a logical order. If a part of object at a given displacement cannot fit on a page based on the location of the beginning of the object in the page and the displacement into the object, the page map is consulted to determine the next logical page. Furthermore, it may be desirable to different page maps for different groups of objects, for example, read-only objects in a shared memory space and updateable objects in a private memory space.

Therefore, managing memory for objects that can be broken up into pages requires calculating the offset of the beginning of an object within a page, determining the logical page number of the object, and identifying the appropriate page map. One approach is save all this information near the beginning of each object in a preheader, but this is wasteful of memory since the page number and page map is identical for every object on the same page. Another approach is to store the page number and a reference to the page map in a page header at the beginning of the page and store the page offset in the object header. Although memory consumption is somewhat reduced, at least one word of memory for the page offset is still required. System performance is adversely affected, because the extra memory fetch is required to reach the object header.

SUMMARY OF THE INVENTION

There exists a need for a memory management system that is portable to, and capable of working with, operating systems that imposes a page-size limitation to contiguous memory. A need exists for an efficient mechanism for calculating which parts of an object belong to which pages. More specifically, there is need to avoid storing page management information in a preheader, which consumes memory and adds to run-time overhead in performance.

These and other needs are addressed the present invention, in which pages are aligned on a predetermined boundary at least as large as the largest page size, for example, on a 4K boundary. A machine pointer to the beginning of an object is masked according to the alignment restriction to determine the starting address of the page and the page header, including the logical page number and, in some embodiment, a reference to the associated page map. Consequently, it is not necessary to load and store the offset of the object in a preheader of the object, thereby saving memory and improving the performance of page-associated memory management operations.

One aspect of the invention relates to a computer-implemented method and a computer-readable medium bearing instructions for managing a paged memory system, in which objects are stored in pages identified by page numbers. The methodology includes allocating a page of memory aligned at an alignment boundary at least as large as a size of the page. A pointer to one of the objects according to the alignment boundary is masked to produce a page address indicative of a beginning of the page, in which at least a portion of the object is stored on the page. The page number is determined for the page based on the page address.

Another aspect of the invention involves a computer-implemented method and computer-readable medium bearing instructions for converting a machine pointer to an object into a page-offset numeric reference. A page-offset numeric reference indicates an offset within a page of memory to the beginning of the object and a page number of the page. The methodology includes masking a pointer to one of the objects according to a predetermined alignment boundary to produce a page address indicative of a beginning of the page; determining the page number based on the page address; and determining the offset based on the page address.

Yet another aspect of the invention pertains to a computer-implemented method and a computer-readable medium bearing instructions for dereferencing a page-offset numeric reference contained in a referencing object and referring to a referenced object. The methodology includes masking a pointer to the referencing object according to a predetermined alignment boundary to produce a page address indicative of a beginning of a referencing page; determining a reference to a page map based on the page address; and determining a machine pointer to the referenced object based on the reference to the page map, the page number, and offset.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method and apparatus for memory management in a run-time environment is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
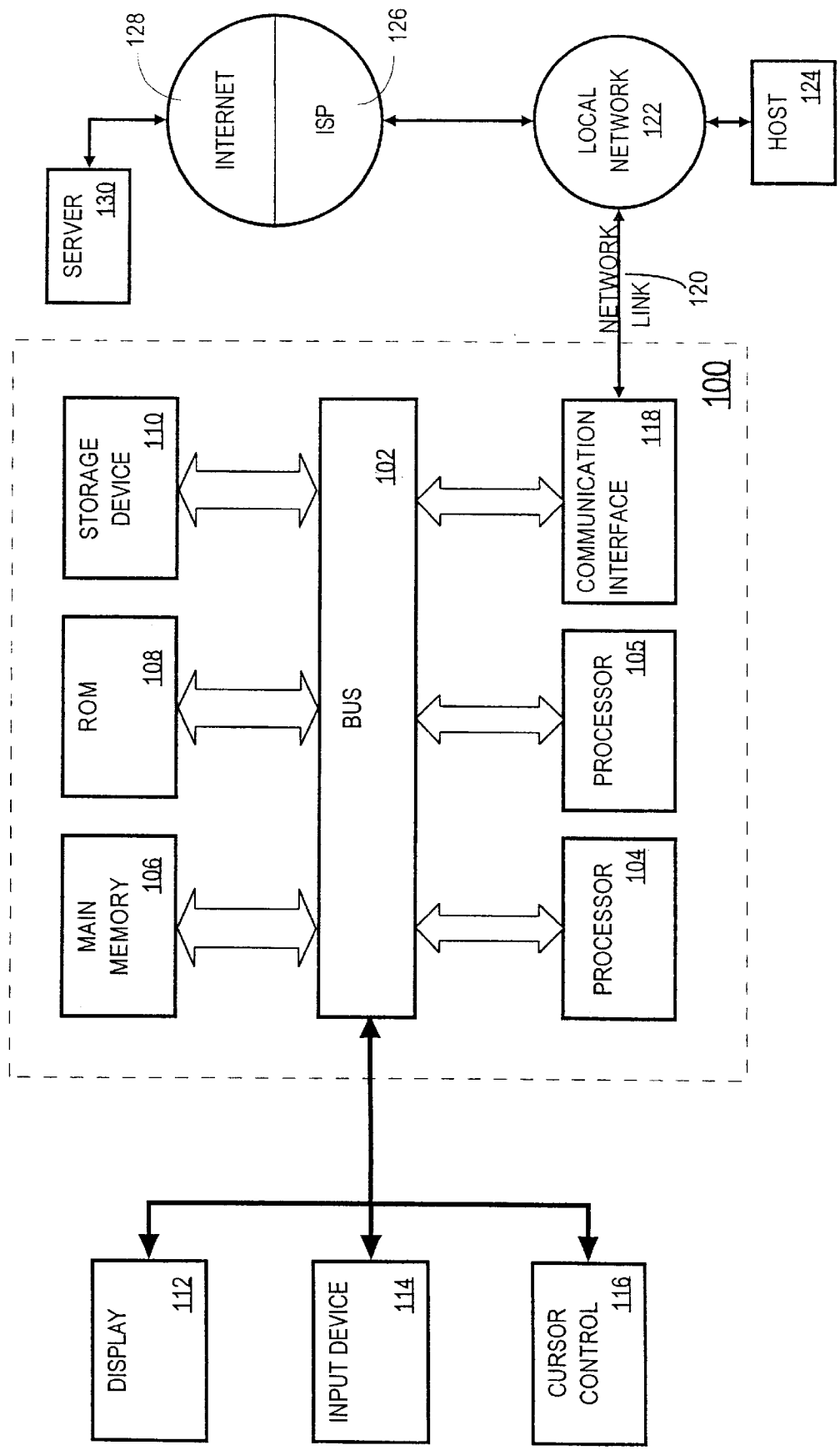
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for memory management in a run-time environment. According to one embodiment of the invention, managing memory in a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for memory management in a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, is preferably a random access storage device such as a magnetic or optical disk. Networked secondary storage is provided by storage devices on other computer systems, for example on host 124, accessible over a local area network 122, or server 130, accessible over a wide area network such as the Internet.

Paged Memory System

When the program state is to be used in server environments in which the maximum size of a contiguous memory segment is severely constrained, it is useful to divide the program state into a plurality of fixed-size contiguous chunks of memory called "pages." A page is a moderately sized contiguous memory segment that is supported within the server environments, especially for shared memory.

To access the various pages of the virtual memory, a page map is maintained to keep track of the pages. Each page is assigned a page number, which is used to index the page map to fetch the virtual address of the beginning of the page, called a page address. A certain amount of space, called a "page header" is reserved at the beginning of the page to store useful information for the memory management of the page, including the page number, the address of the page map, and the base address of the object memory (page address for page 0).

In some embodiments, a plurality of object memories are provided, for example, to hold objects of different durations, to assist in garbage collection, or of other distinct characteristics. An "object memory" is a subset of the virtual address space containing either existing objects or available space for allocating new objects. The pages of an object memory need not be contiguous; in other words, a paged object memory contains a plurality of contiguous memory segments in multiples of the page size.

Figure 2:
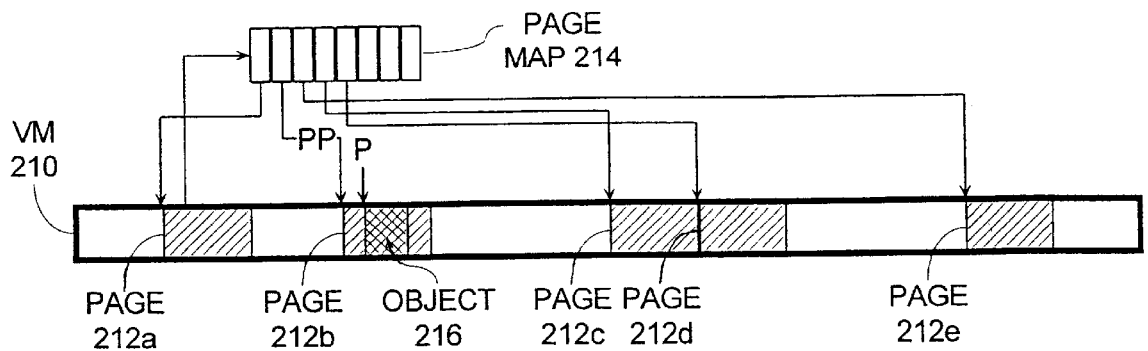
FIG. 2 is a schematic drawing of a portion of a paged memory configuration.

Referring to FIG. 2, virtual address space 210 includes an object memory comprising pages 212*a*, 212*b*, 212*c*, 212*d*, and 212*e*. A page map 214, which in one embodiment is stored in page 0 (212*a*), contains entries for page addresses corresponding to the pages 212*a*, 212*b*, 212*c*, 212*d*, and 212*e*. The page size is preferably moderately sized and compatible with those servers which severely restrict the size of contiguous memory segments. For example, the page size may be in the range of 256 B ($2^8$ bytes) to 32 kB ($2^{15}$ bytes), such as 4 kB ($2^{12}$ bytes). The beginning of page 212*b* is located at a page address marked by page pointer PP. Object 216 is located at an address marked by object machine pointer P within page 212b.

Figure 3:
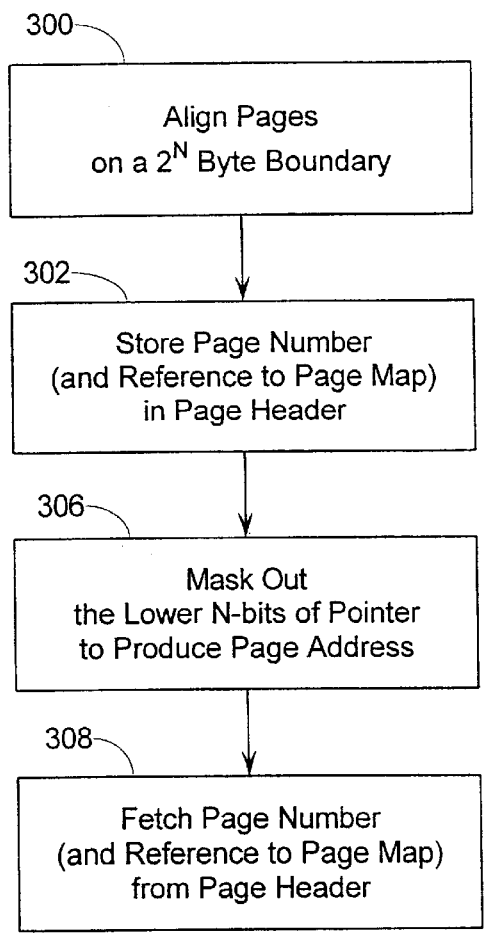
FIG. 3 is a flowchart for storing and accessing page-related memory management related information.

Referring to FIG. 3, in a preliminary step 300, the page is allocated on a $2^N$ byte boundary that is at least as large as the largest size page. For example, if the largest page size is 4K, then the alignment boundary is at least 4K. In a preferred embodiment, all the pages are allocated at a predetermined size and the allocated pages are aligned at an alignment boundary equal to the predetermined size. For example, 4K pages are aligned on 4K boundaries.

At step 302, page-management information relating to the page is stored at a relative displacement from a predetermined location within the page, such as in a reserved area at the beginning of the page, called the page header, or, in another embodiment, at the end of the page in a page footer. For example, the page number of a page may be stored in the page header. The page number can be directly encoded, such as a 1 for page #1, or shifted by the page size (e.g. 1<<12) to facilitate pointer arithmetic in computing a page-offset numeric reference that combines the page number and the offset of the beginning of the object within the page into a single number. In an embodiment implementing a plurality of page maps, a reference to the associated page map is also stored in the header.

During run-time, it may become necessary to access the page related information for an object based on a machine pointer to the object. At step 306, the lower N-bits of the machine pointer is masked off to produce a pointer to the beginning of the page because the page is aligned on a 2N byte boundary. There are a variety of techniques for masking the lower N-bits of the machine pointer, such as applying a logical-and operation with the lower N-bits clear and the remaining bits set (e.g. ptr & ~0x00000FFF) or shifting the machine pointer right by N bits and then shifting the result left by N bits (e.g. (ptr>>12)<<12).

At step 308, the page number that was stored in the page header, which is defined relative to the page-aligned address, is fetched from a location relative to the page address. In an embodiment implementing a plurality of page maps, a reference to the associated page map, also stored in the header, is fetched to access the appropriate page map. The offset within the page of the object referenced by the machine pointer need not be fetched from memory, but calculated as a difference of the address of the object and the address of the aligned page.

By aligning pages at a $2^N$ boundary, the beginning of page is really determinable from a machine pointer to the object. Therefore, an offset indicating the start of the page relative to the object need not be stored along with the object nor fetched from a memory location, thereby saving memory and improving run-time performance.

Page-Offset Numeric References

One aspect relates to efficiently converting machine pointers that point to objects allocated in pages both into and from numeric references that encode the page numbers and offset within the page. A numeric reference employs a machine-independent format for encoding references between objects that is suitable for both run-time use in virtual memory and storage use in secondary storage. Numeric references are easily stored in a secondary storage, in some cases need no conversion at all and in other cases require only minor arithmetic-logical operations such as bit-twiddling and byte rearrangement. For run-time usage, numeric references can be efficiently "dereferenced," that is, converted into a machine pointer, without requiring many memory accesses into an auxiliary symbol table, hash table, tree, or other complex data structure. Therefore, numeric references need not be converted into machines at load time, reducing the overhead of loading program state.

Preferably, numeric references are implemented in a run-time environment that requires all encoded data (e.g. for objects) to be strongly typed and all primitive types, including references, to have an invariant format. For example, floating point numbers are specified to use an IEEE format. In such a run-time environment, references between objects, conventionally implemented by machine pointers, are encoded as an integer value indicating an offset from an implicit machine pointer, having a specified number of bytes, a specified byte-ordering, and a specified alignment. For example, numeric references may be encoded as a little endian, four-byte integer aligned on a eight-byte boundary, although numeric references in accordance with the present invention, of course, are not limited to these particular specifications. Since almost all machines provide a mapping between a numeric type and a native primitive type, data in this format is at least as efficient as, for example, structures generated by C compilers for that machine.

The use of numbers to encode references stems from the realization that the invariant format for encoding objects and primitive types in a run-time environment ensures that every instance of a type will have the same size between platforms. Since every object has a consistent size between platforms, the relative locations between objects are also consistent. Since objects on any platform will be located from some point in the virtual address space at a consistent offset, this offset can be expressed as a consistent number of bytes from a virtual address. Thus, numeric references include an offset portion that indicate a number of bytes from an implicit address. Consequently, numeric references are machine-independent, and program state with numeric references can be used on incompatible processors, such as processors with differently sized machine pointers.

Numeric references within the object memory can be smaller than machine pointers, because an object memory is a subset of the virtual address space. For example, 32-bit (four-byte) numeric references can be profitably used on a computer with a 64-bit virtual address space ($2^{64}$, about 16 billion gigabytes). Since one of the impediments to machine-independence is the differing sizes of machine pointers, fixed-size numeric references, even useful in very large virtual address spaces, helps in attaining a machine-independent reference format.

Numeric references are easily converted into and from machine pointers. Generically, a numeric reference to an object is converted into a machine pointer to the object by adding an offset contained in the numeric reference to an implied virtual address, and, conversely, a machine pointer to the object is converted into a numeric reference by calculating a pointer difference between the machine pointer to the object and the implied virtual address. The implied virtual address points to the beginning of a region of the virtual memory space in which the referencing object or the referenced object is located. The precise identity of the implied virtual address depends more specifically on the species of the numeric reference that is employed.

Figure 4:
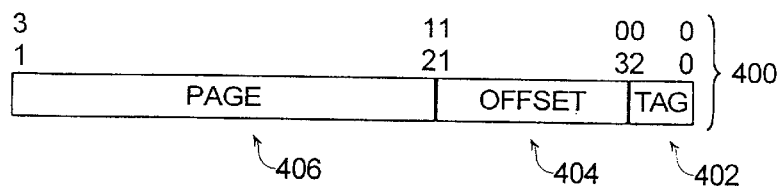
FIG. 4 is schematic drawing of a layout of a page-offset numeric reference.

A page-offset numeric reference to an object is a numeric reference that encodes the location of the object as an offset from the beginning of the page within which the object is located and a page number for the page. FIG. 4 depicts a layout of an exemplary four-byte (32-bit) page-offset numeric reference 400. In some embodiments, the page-offset numeric reference 400 includes, in addition to the offset, a small number of bits for a tag 402, that is used for discriminating among various kinds of numeric and other supported reference formats and to cache storage properties of the referenced object. One function of the tag 402 is described in more detail infra, and it is to be understood, of course, that the present invention is not limited to numeric references that include a tag 402.

The page-offset numeric reference 400 includes an offset 404, which indicates the displacement from a page address. The page address is determined by accessing a page map for the object memory based on a page number 404 also contained in the page-offset numeric reference. If the page-offset numeric reference includes a tag 402 and a page number 406, the offset 404 may be defined as the numeric reference with the tag 402 and the page number 406 masked off. For example, a page-offset numeric reference having a hexadecimal value of 0x00001740 specifies a displacement of 0x00000740 or 1,856 bytes from the page address of page number 1.

For purposes of discussion, it will be assumed that the object machine pointer is not tagged or if the object machine pointer P is tagged, the tag is masked off from the object machine pointer P as the beginning of the calculations. In those embodiments that employ tagged numeric references, then it is assumed that the appropriate tag 402 will be handled separately in the numeric reference 400.

Figure 5:
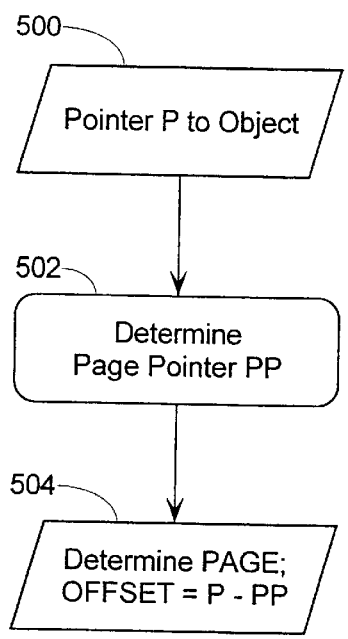
FIG. 5 is a flowchart for generating a page-offset numeric reference from a machine pointer.

FIG. 5 illustrates steps taken to produce a page-offset numeric reference based on a machine pointer P to object 216. At step 500, the machine pointer P to object 216 is obtained, typically from a variable passed into a function, returned from a function or memory allocation operator, loaded from a memory address not part of the program state, or produced by dereferencing a numeric reference. In a working example to illustrate this calculation, a machine pointer P having a value of 0x20446740 is obtained from a pointer parameter passed into a function of the run-time environment.

At step 502, a page pointer PP containing the page address of the page are determined. Since the page is guaranteed to be aligned on a boundary at least as large as the fixed-size of the page, the page address can be determined by masking off the appropriate number of bits from the machine pointer P. In this case, if page is aligned on a 4 kB boundary, then the base pointer can be obtained by masking off the least significant 12 bits to produce, for example, a page address of 0x20446000.

At step 504, the page number 406 and the offset 404 portions of the page-offset numeric reference are determined. The page address is used to fetch the corresponding page number from the page header of page 212b. Preferably, this page number is already shifted by the page size to facilitate the bitwise masking operations. In the example, if the object is in 4 kB page 1 (i.e. page 212b), then the page number would be 1<<12 =0x00001000. The offset 404 is calculated as a difference of the virtual address of the object 216 and the page address of the page 212b. This calculation can be performed by subtracting the page pointer PP from the object pointer P. In the working example, the calculated offset 404 is 0x20446740−0x20446000=0x00000740. Combining the shifted page number and the offset produces a page-offset numeric reference of 0x00001000|0x00000740= 0x00001740. An appropriate tag 402, if implemented, is added or logically-ored into the result.

Figure 6:
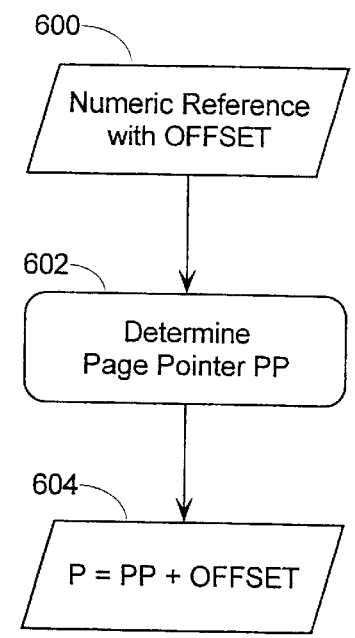
FIG. 6 is a flowchart for dereferencing a page-offset numeric reference.

FIG. 6 illustrates steps taken to produce a machine pointer P based on a page-offset numeric reference to object 216, when numeric references are defined to encode references between objects in the same object memory. References between objects of different object memories, on the other hand, would be encoded in another reference format having the same size of the numeric reference, such as with an indexed reference, which is described infra. At step 600, the page-offset numeric reference to object 216 is obtained, typically by reading from a memory address of the program state. In a working example to illustrate this calculation, a page-offset numeric reference having a value of 0x00001740 is obtained from reading a slot in a referencing object having located at 0x1C209B70 in the virtual address space 210.

At step 602, the page pointer PP containing the page address of the page is determined. First, the appropriate page map 214 needs to be identified, which is found in the page header of the referencing object. Since the page of the referencing object is guaranteed to be aligned on a boundary at least as large as the size of the page, the referencing page address can be determined by masking the appropriate number of bits of the virtual address of the referencing object. In this example, the page is aligned on a 4 kB boundary, the referencing page address pointer can be obtained by masking off the least significant 12 bits to produce a page address of 0x1C209B70 & ~0x00000FFF= 0x1C209000.

Accordingly, the page map 214 is reachable by a field in the referencing page header. The appropriate entry in page map 214 is determined by indexing the page number 206, shifted right by an appropriate amount, e.g. 12 for 4 kB pages. In the working example, let us assume that a page pointer having a page address of 0x20446000 for the referenced object 216 is thus fetched from entry #1 in the page map 214

At step 604, the virtual address of the object 216 is obtained by adding the offset 404 stored in the numeric reference 400 to the page address of the page 212b, fetched from page map 214. This calculation can be performed by adding or logically-oring the offset 404 to the page pointer PP. In the working example, the virtual address of the object 216 is calculated to be 0x20446000+0x00000740= 0x20446740. An appropriate machine pointer tag 402, if necessary, is added or logically-ored into the result.

Pointer and Reference Tagging

Since a paged object crosses a page boundary, slot-access operations for the paged object need additional support from the run-time environment. A slot-access operation gets or sets a value of a "slot" in a object (i.e. a field or instance variable) at a known displacement from the virtual address of the beginning of the object. If the object is contiguous, then the address of the slot can be determined simply by adding the displacement to the beginning of the object. For paged objects, on the other hand, this addition results in an invalid address, because the page boundary may occur between any of the slots and vary from instance to instance.

Accordingly, a slot-access operation of a machine pointer to a paged object requires first converting the machine pointer into a page-offset numeric reference and checking to see if adding the displacement crosses one or more page boundaries. The displacement is added to the page-offset numeric reference and adjusted to account for the size of the page headers for each of the crossed boundaries. The resultant page-offset numeric reference is then dereferenced as described supra.

It is evident that the slot-access operation for a paged object is fairly cumbersome. Therefore, it is desirable, when allocating memory for an object, to find or allocate a new page that can fit the object if possible. Preferably, only those objects that are larger than the effective page size (i.e. the fixed pages size minus the page header size) are allocated on a plurality of pages. Since distinguishing between paged objects and contiguous objects is a common operation in performing a slot-access operation, the contiguity of the referenced object is preferably stored in a machine pointer tag as a storage property to avoid dereferencing the machine pointer to fetch that storage property from the object's header.

As mentioned earlier, some embodiments restrict the use of numeric references for encoding references between objects in the same object memory. Accordingly, indexed references provide a mechanism for supporting references between objects of different object memories. Reference tagging also allows numeric references to be used in conjunction with other reference types. For example, an indexed reference is a type of reference that evaluates to an array entry of one sort of another. Some the non-tag bits of the indexed reference specify the array and others specific an index into the array. A page-offset numeric reference may be thought of a hybrid numeric reference and indexed reference, wherein the page number specifies an index into the page map and the offset portion specifies a relative location of the object within the page.

According to one embodiment, references are tagged to indicate whether the references are page-offset numeric references or indexed references. In other words, a certain number of bits in a reference, for example the higher-order bits or lower-order bits, is reserved for distinguishing between page-offset numeric references and indexed references. The information embedded within the reference, which is likely to be sitting in a fast-access machine register, can therefore be retrieved very quickly, without requiring additional memory cycles to fetch the header of the referenced object.

A preferred implementation of reference tagging introduces an alignment invariant and then exploits the alignment invariant in a run-time environment to encode the information in the lower-order bits. Specifically, objects managed by the run-time environment are stored at an N-bit aligned address, or, in other words, the storage for these objects begins at virtual addresses at $2^N$-byte boundaries. For example, if the objects can be stored at three-bit aligned addresses, that is, on $2^3$=8 byte boundaries, a legal start address for such an object might be 0x20446740, but an address such as 0x20446743 is not a valid start address for the storage of an object. Consequently, the three least significant bits of the reference do not serve to differentiate different objects, since only one of the eight values for the three least significant bits is a legal address and the remaining seven values do not point to any other object. Given this alignment restriction, references that resolve to addresses 0x20446740 through 0x20446747 effectively refer to the same object.

Therefore, any of the N least significant bits of a reference to an N-bit aligned object can be used as a tag to encode other information, namely the format of the numeric reference and storage properties of the reference object. The remaining portion of a pointer holds the aligned address of the object, and the remaining portion of the numeric reference contains the offset for the numeric reference and other information important for the particular format of the numeric reference, such as the page number. For example, tag values of 0 and 4 of a numeric reference may indicate a page-offset numeric reference, while tag values of 2 and 6 indicate an indexed reference. In addition, different types of numeric references may be distinguished by the tag. One other type of numeric reference is a self-relative numeric reference, which encodes the location of a referenced object as an offset to the address of the referenced object.

Page alignment enables the address of a page to be efficiently calculated from a machine pointer to an object that is allocated in a paged memory management system. The lower-order bits of the machine pointer is simply masked off to determine the address of the page. Therefore, it is not necessary to load and store the offset of the object in a preheader, thereby saving memory and improving the performance of page-associated memory management operations.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method of managing a paged memory system, wherein objects are stored in a plurality of pages identified by logical page numbers, said method comprising the computer-implemented steps of:

allocating a page of memory aligned at an alignment boundary at least as large as a size of the page;

masking a pointer to one of the objects according to the alignment boundary to produce a page address indicative of a beginning of the page, wherein at least a portion of the object is stored on the page; and determining a logical page number for the page based on the page address.

2. The method of claim 1, wherein the step of allocating a page of memory aligned at an alignment boundary at least as large as a size of the page includes the step of allocating a predetermined-sized page of memory aligned at an alignment boundary that is the same as the predetermined size.

3. The method of claim 1, further comprising the step of storing the logical page number at a memory address on the page;

wherein the step of determining a logical page number for the page based on the page address includes the step of fetching the logical page number from the memory address.

4. The method of claim 3, further comprising:

storing a reference to a page map at another memory address on the page; and fetching the reference to the page map based on the page address.

5. A method of converting a machine pointer to an object into a page-offset numeric reference, wherein the page-offset numeric reference indicates an offset within a page of memory to the beginning of the object and a page number of the page, said method comprising the computer-implemented steps of:

masking a pointer to the object according to a predetermined alignment boundary to produce, a page address indicative of a beginning of the page;

determining the page number based on the page address; and determining the offset based on the page address.

6. The method of claim 5, wherein the step of determining the page number based on the page address includes the step of fetching the page number from an address on the page.

7. The method of claim 5, wherein the step of determining the offset based on the page address includes the step of calculating a pointer difference between the pointer to the object and the page address.

8. A method of dereferencing a page-offset numeric reference contained in a referencing object and referring to a referenced object, wherein the page-offset numeric reference indicates an offset within a page of memory to the beginning of the referenced object and a page number of the page, said method comprising the computer-implemented steps of:

masking a pointer to the referencing object according to a predetermined alignment boundary to produce a page address indicative of a beginning of a referencing page;

determining a reference to a page map based on the page address; and determining a machine pointer to the referenced object based on the reference to the page map, the page number, and offset.

9. The method of claim 8, wherein the step of determining a machine pointer to the referenced object based on the reference to the page map, the page number, and offset includes the steps of:

indexing the page map based on the page number to fetch a page pointer; and adding the offset to the page pointer to produce the machine pointer to the referenced object.

10. A computer-readable medium bearing instructions for managing a paged memory system, wherein objects are stored in a plurality of pages identified by logical page numbers, said instructions arranged, when executed by one or more processors, to cause the one or more processors to perform the steps of:

allocating a page of memory aligned at an alignment boundary at least as large as a size of the page;

masking a pointer to one of the objects according to the alignment boundary to produce a page address indicative of a beginning of the page, wherein at least a portion of the object is stored on the page; and determining a logical page number for the page based on the page address.

11. The computer-readable medium of claim 10, wherein the step of allocating a page of memory aligned at an alignment boundary at least as large as a size of the page includes the step of allocating a predetermined-sized page of memory aligned at an alignment boundary that is the same as the predetermined size.

12. The computer-readable medium of claim 10, wherein said instructions are further arranged to cause the one or more processors to perform the step of storing the logical page number at a memory address relative on the page;

wherein the step of determining a logical page number for the page based on the page address includes the step of fetching the logical page number from the memory address.

13. The computer-readable medium of claim 12, wherein said instructions are further arranged to cause the one or more processors to perform the steps of:

storing a reference to a page map at another memory address relative to the beginning of the page; and fetching the reference to the page map based on the page address.

14. A computer-readable medium bearing instructions for converting a machine pointer to an object into a page-offset numeric reference, wherein the page-offset numeric reference indicates an offset within a page of memory to the beginning of the object and a page number of the page, said instructions arranged, when executed by one or more processors, to cause the one or more processors to perform the steps of:

masking a pointer to the object according to a predetermined alignment boundary to produce a page address indicative of a beginning of the page;

determining the page number based on the page address; and determining the offset based on the page address.

15. The computer-readable medium of claim 14, wherein the step of determining the page number based on the page address includes the step of fetching the page number from an address on the page.

16. The computer-readable medium of claim 14, wherein the step of determining the offset based on the page address includes the step of calculating a pointer difference between the pointer to the object and the page address.

17. A computer-readable medium bearing instructions for dereferencing a page-offset numeric reference contained in a referencing object and referring to a referenced object, wherein the page-offset numeric reference indicates an offset within a page of memory to the beginning of the referenced object and a page number of the page, said instructions arranged, when executed by one or more processors, to cause the one or more processors to perform the steps of:

masking a pointer to the referencing object according to a predetermined alignment boundary to produce a page address indicative of a beginning of a referencing page;

determining a reference to a page map based on the page address; and determining a machine pointer to the referenced object based on the reference to the page map, the page number, and offset.

18. The computer-readable medium of claim 17, wherein the step of determining a machine pointer to the referenced object based on the reference to the page map, the page number, and offset includes the steps of:

indexing the page map based on the page number to fetch a page pointer; and adding the offset to the page pointer to produce the machine pointer to the referenced object.

19. The method of claim 1, wherein at least another portion of the object is stored on another page.

20. The method of claim 5, wherein at least another portion of the object is stored on another page.

21. The method of claim 8, wherein at least another portion of the object is stored on another page.

22. The computer-readable medium of claim 10, wherein at least another portion of the object is stored on another page.

23. The computer-readable medium of claim 14, wherein at least another portion of the object is stored on another page.

24. The computer-readable medium of claim 17, wherein at least another portion of the object is stored on another page.

25. The method of claim 3, wherein the address on the page is relative to the beginning of the page.

26. The method of claim 6, wherein the address on the page is relative to the beginning of the page.

27. The computer-readable medium of claim 12, wherein the address on the page is relative to the beginning of the page.

28. The computer-readable medium of claim 15, wherein the address on the page is relative to the beginning of the page.

\* \* \* \* \*